United States Patent [19]

Verros

[11] 4,311,322
[45] Jan. 19, 1982

[54] SELF-LOCKING FOLDING OUTRIGGER ASSEMBLY

[75] Inventor: James M. Verros, Beresford, S. Dak.

[73] Assignee: CMI Corporation, Oklahoma City, Okla.

[21] Appl. No.: 135,437

[22] Filed: Mar. 31, 1980

[51] Int. Cl.³ ............................................. B62D 21/00
[52] U.S. Cl. .................................... 280/656; 16/350; 105/372; 105/393; 296/174
[58] Field of Search .................. 280/638, 35, 639, 42, 280/656, 789, 107; 296/169, 174, 26; 108/80, 81, 82; 248/421; 16/147, 179; 105/372, 393

[56] References Cited

U.S. PATENT DOCUMENTS

| | | | |
|---|---|---|---|
| 1,466,224 | 8/1923 | Hans | 296/174 |
| 1,864,047 | 6/1932 | Lawhorne | 296/169 |
| 1,918,040 | 7/1933 | Kassick | 16/179 X |
| 4,015,858 | 4/1977 | Love | 280/656 |

FOREIGN PATENT DOCUMENTS

224845 12/1962 Austria .................................. 108/81
755640 8/1956 United Kingdom .................. 108/81

*Primary Examiner*—Joseph F. Peters, Jr.
*Assistant Examiner*—Michael Mar
*Attorney, Agent, or Firm*—Dunlap, Codding & McCarthy

[57] ABSTRACT

A folding, self-locking outrigger for a load transporting vehicle, the outrigger disposed on a side of the vehicle such that the outrigger is movable between a first position wherein the outrigger is disposed substantially adjacent the side of the vehicle and a second position wherein the outrigger, in combination with adjacent outriggers, is adapted to receive an extension member so that the width of the vehicle can be increased. The folding outrigger is characterized as having a first linkage assembly, a second foldable linkage assembly, and a combination pivot-locking assembly. The combination pivot-locking assembly, which is operably connected to the second foldable linkage assembly such that the outrigger can be pivotally moved between the first and second position, secures the outrigger in the first and second position.

18 Claims, 8 Drawing Figures

SELF-LOCKING FOLDING OUTRIGGER ASSEMBLY

BACKGROUND OF THE INVENTION

1. Field of the Invention

This invention relates generally to load transporting vehicles and, more particularly, but not by way of limitation, to a folding outrigger for use on a load transporting vehicle so that the dimensions of the load supporting structure of the vehicle can be increased.

2. Description of the Prior Art

Large sums of money are currently being spent annually on construction. A substantial portion of such construction will require the use of large, heavy equipment. Transportation of the equipment will become increasingly more important requiring more advanced and economical load transporting vehicles. Desirably, such will be accomplished by designing new and improved trailers and accessories therefor which will enable such trailers to carry heavier loads.

Heretofore, outriggers have been employed on trailers, such as low-bed type trailers, to increase the width of such trailers so that the trailers can carry equipment having a width greater than the width of the load supporting structure or bed of the trailer. The outriggers heretofore employed have generally been attached to the sides of the trailer so that each of the outriggers can be pivotally moved horizontally from a position adjacent the sides of the trailer to an extended position where the outriggers extend away from the side of the trailer. However, in the use of the prior art outriggers, problems have been encountered in that the spacing required between the outriggers for attachment of same to the side of the trailer has limited the amount of load which can be placed upon the trailer when the outriggers are used to assist in supporting the load. Further, the prior art outriggers which are pivotally moved in a horizontal direction may become unsecured as the trailer is moving down a roadway thus resulting in one or more of the outriggers swinging in a to and fro motion. This undesired to and fro swinging movement of the outrigger may damage or break the outrigger.

None of the prior art outriggers have fully met the requirement of being a self-storing, self-locking assembly which can be positioned on the trailer substantially adjacent another outrigger so that the trailer can readily be adapted to carry wider and heavier payloads. Thus, new and useful outriggers are constantly being sought which are durable in construction and which can be employed to assist in the supporting of heavier payloads. Further, new and useful outriggers are being sought which do not suffer from the before-mentioned disadvantages of the prior art outriggers. The new and improved outriggers should be economical to manufacture, durable in construction, relatively maintenance free, and be designed and constructed to become a part of the trailer without substantially increasing the weight or dimensions of the trailer.

SUMMARY OF THE INVENTION

The present invention provides a folding, self-locking outrigger assembly for a load transporting vehicle wherein the outrigger is secured to a side of the vehicle such that the outrigger is movable between a first or retracted position wherein the outrigger is disposed substantially adjacent the side of the vehicle and a second or extended position wherein the outrigger, in combination with adjacent outriggers, is adapted to receive an extension member such that the width of the load supporting structure of the vehicle can be increased. Broadly, the folding, self-locking outrigger assembly of the present invention comprises a first linkage assembly having a first end portion and a second end portion, a second foldable linkage assembly having a first end portion and an opposed second end portion, and a combination pivot-locking assembly operably disposed on the second foldable linkage assembly such that the second foldable linkage assembly can be moved from a folded or first position via the pivot action of the combination pivot-locking assembly to an extended or second position. In addition, the pivot-locking assembly cooperates with the first linkage assembly and the second linkage assembly to secure and lock the folding outrigger assembly in one of the retracted and extended positions.

More specifically, the first end portion of the first linkage assembly is pivotally connected to the side of the vehicle such that the first linkage assembly is vertically pivotable from a first position substantially adjacent the side of the vehicle to a second position wherein the longitudinal axis of the first linkage assembly is substantially parallel to a lateral axis of the vehicle, (the lateral axis being the axis extending substantially normal to the longitudinal axis of the vehicle) the first end portion of the second foldable linkage assembly is pivotally connected to the opposed second end of the first linkage assembly, and the opposed second end portion of the second foldable linkage assembly is pivotally connected to the side of the vehicle a distance from the pivotal attachment of the first end portion of the first linkage assembly to the side of the first end portion of the first linkage assembly to the side of the vehicle such that the opposed second end portion of the second foldable linkage assembly and the first end portion of the first linkage assembly are vertically aligned.

An object of the invention is to provide an improved outrigger for a load transporting vehicle.

Another object of the invention is to provide an improved outrigger which can be positioned substantially adjacent other of the outriggers so that heavier loads can be partially supported thereon.

Another object of the invention is to provide an outrigger which is durable in construction, economical to manufacture, substantially maintenance free, and which does not suffer from the disadvantages of the prior art devices.

These and other objects, advantages and features of the present invention will become apparent to those skilled in the art from a reading of the following detailed description when read in conjunction with the accompanying drawings which illustrate the invention, and with the appended claims.

DESCRIPTION OF THE PREFERRED EMBODIMENT

Figure 1:
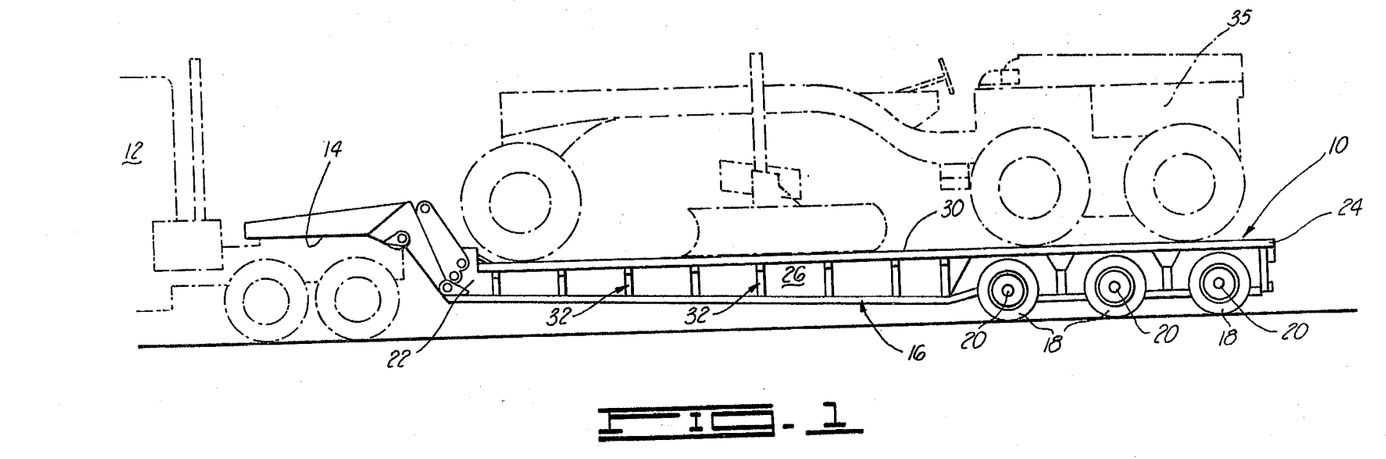
FIG. 1 is a side elevational view of a typical lowbed, heavy duty trailer having a plurality of the folding, self-locking outrigger assemblies of the present invention disposed along the side thereof.
Figure 2:
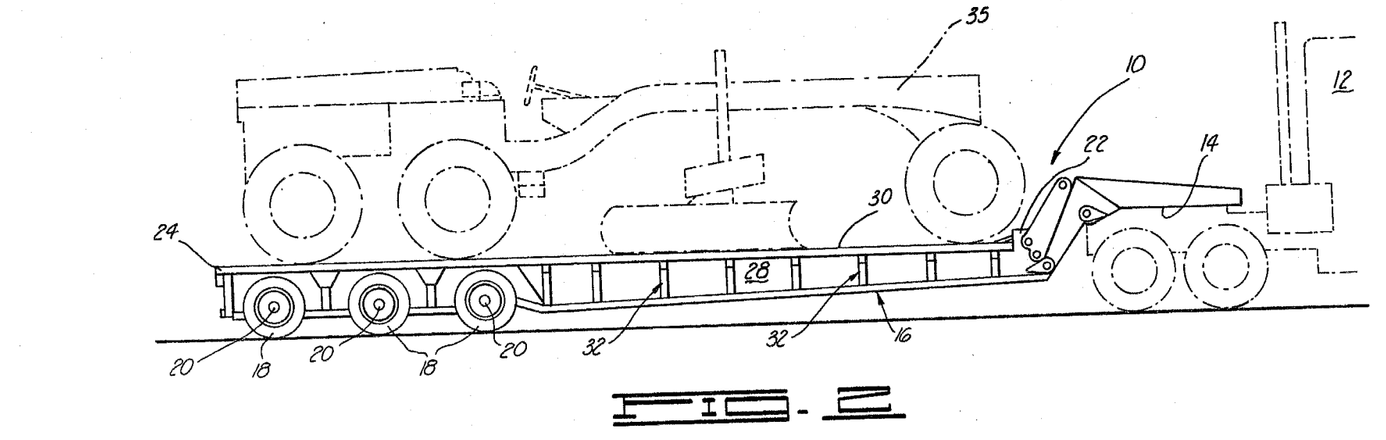
FIG. 2 is an opposed side elevational view of the lowbed heavy duty trailer of FIG. 1 having a plurality of the folding, self-locking outrigger assemblies of the present invention attached to the side portion thereof.
Figures 3, 4, 5:
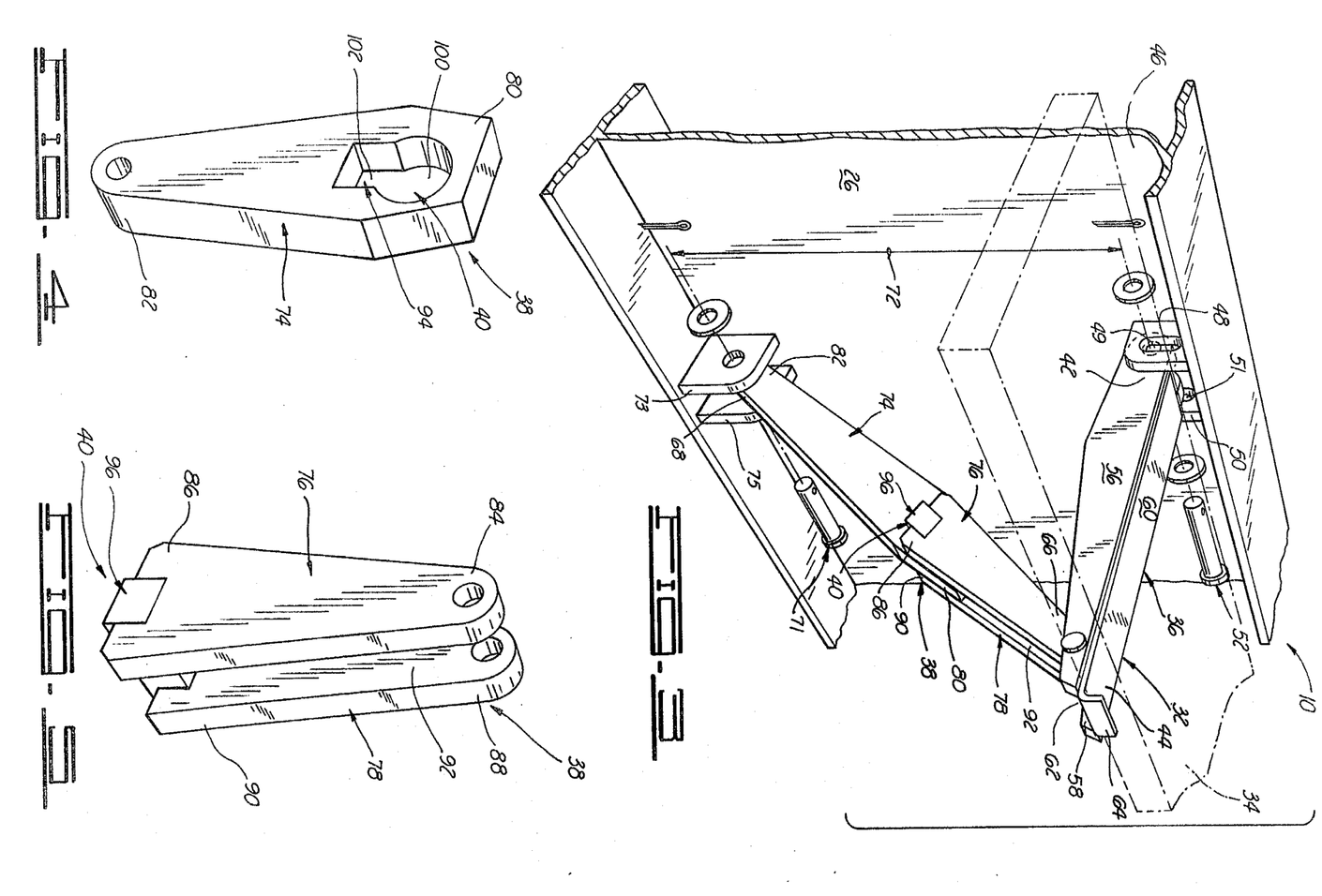
FIG. 3 is a partially exploded, perspective view of a folding self-locking outrigger assembly of the present invention positionable on a side portion of the trailer, the outrigger assembly being depicted in an extended position and having a load supporting member, depicted in phantom, positioned thereon.
FIG. 4 is an enlarged, perspective view of a lower linkage member of the second foldable linkage assembly of the folding, self-locking outrigger assembly of the present invention.
FIG. 5 is an enlarged, perspective view of an upper linkage member of the foldable second linkage assembly of the folding, self-locking outrigger assembly of the present invention.
Figure 6:
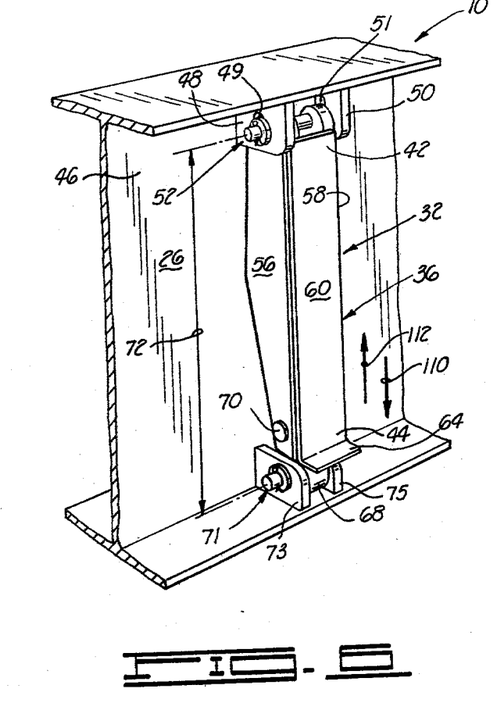
FIG. 6 is a perspective view of the folding, self-locking outrigger assembly of the present invention in a folded, locked position.
Figure 8:
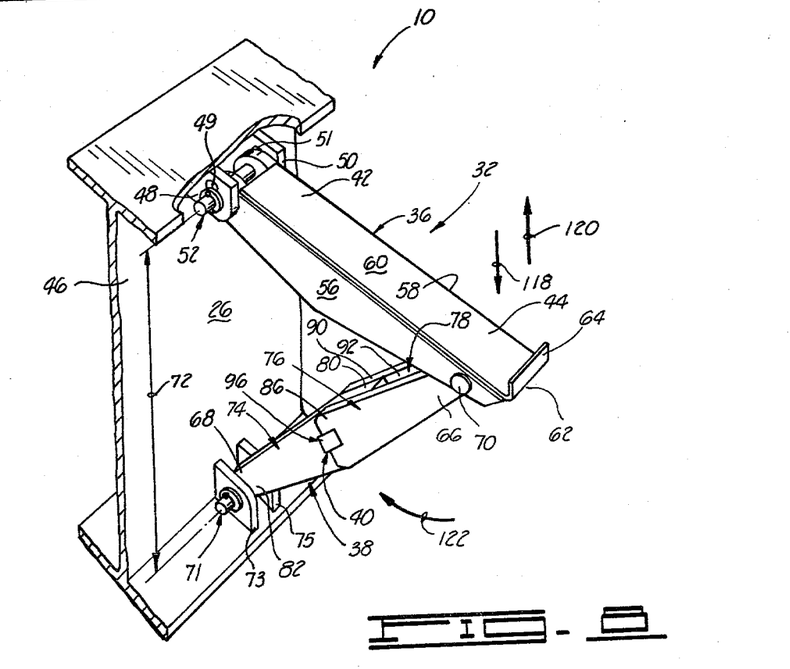
FIG. 8 is a perspective view of the folding, self-locking outrigger assembly of the present invention wherein the outrigger assembly is in an extended, locked position and adapted to receive a load support member thereon for increasing the load carrying capacity of the trailer.

Referring to the drawings, and particularly to FIGS. 1 and 2, a semi-trailer 10 is operably connected to a tractor 12 by a conventional fifth wheel 14. The semi-trailer 10 comprises a trailer frame 16 mounted on wheels 18 by axles 20. The semi-trailer 10 is provided with a forward end 22, a rearward end 24, a first side 26, a second side 28, and a load supporting structure or bed 30. The axles 20 and the load supporting structure or bed 30 of the semi-trailer 10 are secured to the trailer frame 16 by any suitable means well known in the art. A plurality of folding, self-locking outrigger assemblies 32 are positioned along the first and second sides 26, 28 of the semi-trailer 10 such that each of the outriggers 32 is vertically movable between a first or retracted position (as shown in FIG. 6) and a second or extended position (as depicted in FIGS. 3 and 8). In the first or retracted position each of the outriggers 32 is substantially vertically disposed on one of the first and second sides 26, 28 of the semi-trailer 10; whereas, in the second or extended position each of the outriggers 32 extends from the first and second sides 26, 28 of the semi-trailer 10 and is adapted to receive an extension member 34 so that the load supporting structure or bed 30 of the semi-trailer 10 can be increased in width by the combination of the plurality of the folding outriggers 32 and the extension member 34. Each of the folding outriggers 32 and the first and second sides 26, 28 of the semi-trailer 10 to which the outriggers 32 are attached are substantially identical in construction and operation. Thus, for the sake of simplifying the discussion relating to the folding, self-locking outrigger assemblies 32, and their attachment to the first and second sides 26, 28 of the semi-trailer 10, only one of the folding, self-locking outrigger assemblies 32, and its attachment to a portion of the first side 26 of the semi-trailer 10 will be described with reference to FIGS. 3–8.

Referring now to FIGS. 3–8, the folding, self-locking outrigger assembly 32 (hereinafter referred to as the folding outrigger) comprises a first linkage assembly 36, a second foldable linkage assembly 38, and a combination pivot-locking assembly 40. The first linkage assembly 36, an elongated member, is provided with a first end portion 42 and an opposed second end portion 44. The first end portion 42 of the first linkage assembly 36 is pivotally connected to the first side 26 of the semi-trailer 10 near an upper portion 46 thereof via a pair of spatially disposed lug members 48, 50 and pivot assembly 52. The pivotal attachment of the first end portion 42 of the first linkage assembly 36 to the first side 26 of the semi-trailer 10 allows the first linkage assembly 36 to be movable between a first position wherein the first linkage assembly 36 is vertically disposed substantially adjacent the first side 26 of the semi-trailer 10, and a second position wherein the longitudinal axis of the first linkage assembly 36 is substantially parallel to the lateral axis of the load support structure or bed 30 of the semi-trailer 10.

The lug members 48, 50 are each provided with a vertically disposed elongated aperture 49, 51, respectively, for receiving the pivot assembly 52. Thus, the pivot assembly 52 can be vertically moved within the confines of the elongated apertures 49 and 51. The elongated apertures 49, 51 of the lug members 48, 50, respectively, enable one to more easily move the folding outrigger 32 (e.g., the first linkage assembly 36 and the second foldable linkage assembly 38 of the folding outrigger 32) between the first or retracted position and the second or extended position. Further, the elongated apertures 49, 51 cooperate with the pivot-locking assembly 40 of the folding outrigger 32 to secure and lock the folding outrigger 32 in the first or retracted position (as shown in FIG. 6) or in the second or extended position (as shown in FIGS. 3 and 8). In addition, the elongated apertures 49, 51 of the lug members 48, 50, respectively, enable one to disengage or unlock the pivot-locking assembly 40 when the folding outrigger 32 is in either the first or second position and it is desirable to move the folding outrigger 32 to the other of the first or second position. The interaction between the elongated apertures 49, 51 of the lug members 48, 50, the pivot assembly 52 and the pivot-locking assembly 40 will be described in more detail hereinafter.

The first linkage assembly 36 comprises a first side 56, a second side 58, and an upper side 60. The first and second sides 56, 58 of the first linkage assembly 36 are disposed in a parallel, spatial relationship and are interconnected via the upper side 60 substantially as shown in the drawings. Thus, the first side 56, the second side 58, and the upper side 60 cooperate to form a recessed portion 62 in the first linkage assembly 36 which extends the length of the first linkage assembly 36. The recessed portion 62 of the first linkage assembly 36 is adapted to receive the second foldable linkage assembly 38 therein when the first linkage assembly 36 is in a first position substantially vertically disposed adjacent the first side 26 of the semi-trailer 10 and the second foldable linkage assembly 38 is in a folded first position as depicted in FIG. 6.

The opposed second end portion 44 of the first linkage assembly 36 is provided with a tab 64. The tab 64 extends from the upper side 60 of the first linkage assembly 36 so that the tab 64 and the upper side 60 of the first linkage assembly 36 cooperate to support and maintain the extension member 34 thereon so that the width of the semi-trailer 10 can be extended when the first linkage assembly 36 is secured in a second position by the second foldable linkage assembly 38 (which is secured in an extended second position) and the combination pivot-locking assembly 40, as will be described in detail hereinafter. Desirably, the tab 64 and the upper side 60 of the first linkage assembly 36 are of unitary construction.

The second foldable linkage assembly 38 of the folding outrigger 32 is provided with a first end portion 66 and an opposed second end portion 68. The first end portion 66 of the second foldable linkage assembly 38 is pivotally connected to the opposed second end portion 44 of the first linkage assembly 36 via a pivot assembly 70. The opposed second end portion 68 of the second foldable linkage assembly 38 is pivotally connected to the first side 26 of the semi-trailer 10 via a pivot assembly 71 and a pair of spatial disposed lug members 73, 75 secured to the first side 26 of the semi-trailer 10 such that the opposed second end portion 68 of the second foldable linkage assembly 38 is pivotally connected to the first side 26 of the semi-trailer 10 a distance 72 from the first end portion 42 of the first linkage assembly 36 and vertically aligned therewith.

The second foldable linkage assembly 38 comprises a lower linkage member 74, and a pair of upper linkage members 76, 78. The lower linkage member 74 is provided with a first end portion 80 and an opposed second end portion 82. The upper linkage member 76 is provided with a first end portion 84 and an opposed second end portion 86; and the upper linkage member 78 is provided with a first end portion 88 and an opposed second end portion 90. The upper linkage member 76, 78 are disposed in a parallel, spatial relationship such that space 92 is formed therebetween so that the lower linkage member 74 can be positioned within the space 92 between the upper linkage members 76, 78 when the folding outrigger 32 is in the first position as depicted in FIG. 6. Thus, in an assembled position the first end portion 80 of the lower linkage member 74 is pivotally connected to the opposed second end portion 86, 90 of the upper linkage members 76, 78, respectively, via the combination pivot-locking assembly 40; the opposed second end portion of the lower linkage member is pivotally connected to the side 26 of the semi-trailer 10 via lug members 73, 75 and the pivot assembly 71; and the first end portion 84, 88 of the upper linkage members 76, 78, respectively, are pivotally connected to the opposed second end portion 44 of the first linkage assembly 36 via the first and second sides 56, 58 and the pivot assembly 70.

As more clearly shown in FIGS. 4 and 5, the combination pivot-locking assembly 40 comprises a key-shaped opening 94 disposed in the first end portion 80 of the lower linkage member 74, and a substantially rectangular-shaped member 96 disposed on the opposed second end portions 86, 90 of the upper linkage members 76, 78, respectively. The rectangular-shaped member 96 extends across a portion of the space 92 between the opposed second end portions 86, 90 of the upper linkage members 76, 78, respectively, so that the longitudinal axis of the rectangular-shaped member 96 is substantially perpendicular or normal to the longitudinal axis of the upper linkage members 76, 78. In the assembled position the rectangular shaped member 96 (which interconnects a portion of the opposed second ends 86, 90 of the upper linkage members 76, 78, respectively) is positioned through the key-shaped opening 94 of the lower linkage member 74. Thus, the first end portion 80 of the lower linkage member 74 is operably connected to the opposed second end portions 86, 90 of the upper linkage members 76, 78 respectively, via the key-shaped opening 94 and the rectangular shaped member 96. Further, the construction and design of the pivot-locking assembly 40 (i.e. the rectangular shaped member 96 and the key-shaped opening 94) provides the pivot-locking assembly 40 with a pivoting mode and a locking mode. In the pivoting mode of the pivot-locking assembly 40, the rectangular shaped member 96 of the combination pivot-locking assembly 40 is positioned within an enlarged substantially circular portion 100 of the key-shaped opening 94 and the folding outrigger 32 is movable between the first or retracted position and second or extended position. On the other hand, when the pivot-locking assembly 40 is in the locking mode, the rectangular shaped member 96 of the combination pivot-locking assembly 40 is slidably positioned within a substantially square-shaped portion 102 of the key-shaped opening 94 so that the folding outrigger 32 is secured or locked in either the first, retracted position or the second, extended position.

In order to further illustrate the folding outrigger 32 of the present invention, the following modes of operation wherein the folding outrigger 32 is moved from the locked first, retracted position (as depicted in FIG. 6) to the locked second, extended position (as depicted in FIG. 8) are set forth. Further, the reverse sequence of moving the folding outrigger 32 from the locked second, extended position (as depicted in FIG. 8) to the locked first, retracted position (as depicted in FIG. 6) will also be set forth.

Figure 7:
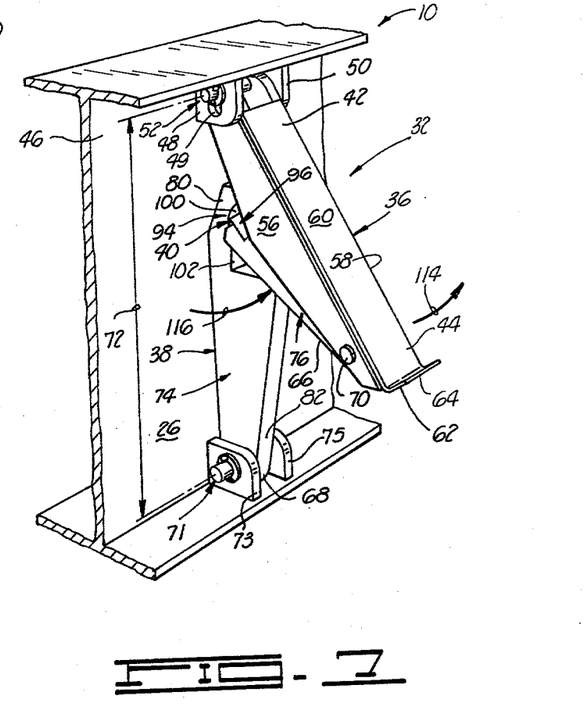
FIG. 7 is a perspective view of the folding, self-locking outrigger assembly of the present position, the outrigger assembly being depicted at a position substantially intermediate a retracted, locked position and an extended, locked position.

To illustrate the movement of the folding outrigger 32 from the locked first, retracted position to the locked second, extended position reference will be made, in sequence, to FIGS. 6, 7 and 8. As previously set forth, the folding outrigger 32 comprises the first linkage assembly 36, the second foldable linkage assembly 38, and the combination pivot-locking assembly 40. The first end portion 42 of the first linkage assembly 36 is pivotally connected to the first side 26 of the semi-trailer 10 near the upper portion 46 thereof via the pair of spatially disposed lug members 48, 50 and the pivot assembly 52. The opposed second end portion 44 of the first linkage assembly 36 is pivotally connected to the first end portion 66 of the second foldable linkage assembly 38 via the pivot assembly 70; and the opposed second end portion 68 of the second foldable linkage assembly 38 is pivotally connected to the first side 26 of the semi-trailer 10 via the spatially disposed lug members 73, 75 and the pivot assembly 71 such that the opposed second end portion 68 of the second foldable linkage assembly 38 is pivotally connected to the side 26 of the semi-trailer 10 the distance 72 from the first end portion 42 of the first linkage assembly 36. Further, as shown in the drawing, the opposed second end portion 68 of the second foldable linkage assembly 38 is pivotally connected to the first side 26 of the semi-trailer 10 such that the opposed second end portion 68 of the second foldable linkage assembly 38 is vertically aligned with the pivotal attachment of the first end portion 42 of the first linkage assembly 36 to the first side 26 of the semi-trailer 10. In addition, the construction and design of the first linkage assembly 36, the second foldable linkage assembly 38, and the combination pivot-locking assembly 40 of the folding outrigger 32 enables the second foldable linkage assembly 38 to be foldably disposed in a folded first position within the recessed portion 62 formed by the first and second sides 56, 58 and the upper side 60 of the first linkage assembly 36 when the first linkage assembly 36 is in the first position, i.e., the folding outrigger 32 is in the first or retracted position as depicted in FIG. 6.

The second foldable linkage assembly 38 which comprises the lower linkage member 74 and the pair of upper linkage members 76, 78 are interconnected via the combination pivot-locking assembly 40 such that the lower linkage member 74 can be pivotally disposed, in a folded position, within the space 92 formed between the upper linkage members 76, 78 of the second foldable linkage assembly 38 when the second foldable linkage assembly is in the folded first position.

The pivot-locking assembly 40 comprising the key-shaped opening 94 (having the enlarged circular portion 100 and the substantially square-shaped portion 102 communicating therewith) disposed in the first end portion 80 of the lower linkage member 74 and the rectangular-shaped member 96 interconnecting the opposed second end portions 86, 90 of the upper linkage member 76, 78 operably connects the first end portion 80 of the lower linkage member 76 to the opposed second end portions 86, 90 of the upper linkage members 76, 78, respectively. Thus, in the assembled position, the rectangular-shaped member 96 of the upper linkage members 76, 78 is positioned through the key-shaped opening 94 of the lower linkage member 76. The cooperation between the rectangular-shaped member 96 and the key-shaped opening 94 enables the second foldable linkage assembly 38 to be movable between the folded first position, and the extended second position.

To accomplish the pivotal movement of the first linkage assembly 36 and the second foldable linkage 38 of the folding outrigger 32 of the present invention, the substantially rectangular-shaped member 96 disposed on the opposed second end portions 86, 90 of the upper linkage members 76, 78 is positioned in the enlarged substantially circular portion 100 of the key-shaped opening 94 of the lower linkage member 74. By positioning the rectangular-shaped member 96 within the enlarged substantially circular portion 100 of the key-shaped opening 94 the first linkage assembly 36 and the second foldable linkage assembly 38 can be pivotally moved so that the folding outrigger 32 is movable between one of the first, retracted position (as depicted in FIG. 6) and the second, extended position (as depicted in FIG. 8).

On the other hand, when the folding outrigger 32 is to be locked in the first, retracted position the first linkage assembly 36 and the second foldable linkage assembly 38 are pivotally moved to the respective position and thereafter a downward force, indicated by the direction of the arrow 110, is applied to the tab 64 of the first linkage assembly 36 so that the rectangular-shaped member 96 of the combination pivot-locking assembly 40 is moved from the substantially circular portion 100 of the key-shaped opening 94 and into the square-shaped portion 102 thereof. Thus, the folding outrigger 32 is locked in the first, retracted position as depicted in FIG. 6.

To move the folding outrigger 32 from the locked first, retracted position to the second, extended position, an upward force, indicated by the direction of the arrow 112, is applied to the tab 64 of the first linkage assembly 36 so that the rectangular-shaped member 96 of the combination pivot-locking assembly 40 is moved from engagement with the square-shaped portion 102 of the key-shaped opening 94 of the pivot-locking assembly 40 and into the enlarged substantially circular portion 100 of the key-shaped opening 94. Thereafter, the first and second linkage assemblies 36, 38 can be pivotally moved to their respective second positions in a direction indicated by the arrow 114 (shown in FIG. 7) to move the folding outrigger 32 from the first, retracted position to the second, extended position. During the movement of the first and second linkage assemblies 36, 38 of the folding outrigger 32 from the respective first position to the second positions, one applies a force, such as through a lifting action, to the upper linkage members 76, 78 of the second foldable linkage assembly 38 at a position indicated by the arrow 116 (see FIG. 7) so that the rectangular-shaped member 96 of the combination pivot-locking assembly 40 is maintained within the enlarged substantially circular portion 100 of the key-shaped opening 94 thereof.

Once the foldable linkage assembly 32 has been moved to the second, extended position, (via the movement of the first and second linkage assemblies 36, 38 to their respective second positions) a downward force, indicated by the direction of the arrow 118, is applied to the first linkage assembly 36. The application of the downward force in the direction 118 moves the rectangular-shaped member 96 of the combination pivot-locking assembly 40 from the enlarged substantially circular portion 100 of the key-shaped opening 94 and into the square-shaped portion 102 of the key-shaped opening 94. Thus, the first and second linkage assemblies 36, 38 are locked the respective second positions and thus the folding outrigger 32 is locked in the second, extended position.

When the folding outrigger 32 is in the second, extended position, and it is determined desirable to move the folding outrigger 32 from the second, extended position to the first, retracted position, such can be accomplished by a plurality of steps which will now be described with reference to FIGS. 8, 7 and 6, in sequence. To move the folding outrigger 32 from the second, extended position (as depicted in FIG. 8) to the first, retracted position (as depicted in FIG. 6) an upward force is applied to the first linkage assembly 36 in the direction of the arrow 120. The application of upward force on the first linkage assembly 36 moves the rectangular-shaped member 96 of the combination pivot-locking assembly 40 from engagement with the square-shaped portion 102 of the key-shaped opening 94 and positions the rectangular-shaped member 96 within the enlarged substantially circular portion 100 of the key-shaped opening 94. Once the rectangular-shaped member 96 is positioned within the enlarged substantially circular portion 100 of the key-shaped opening 94 a force is applied to the second foldable linkage assembly 38 in the direction of the arrow 122 so that the second foldable linkage assembly 38 is moved towards its folded first position and disposed within the recessed portion 62 of the first linkage assembly 36 as shown in FIG. 7. Thereafter, a force is applied to the upper linkage members 76, 78 of the second foldable linkage assembly 36 at a position indicated by the arrow 116 so as to maintain the rectangular-shaped member 96 of the combination pivot-locking assembly 40 in the enlarged, substantially circular portion 100 of the key-shaped opening 94. Once the foldable outrigger 32 has been moved to the first, retracted position (as depicted in FIG. 6) a force is applied to the tab 64 of the first linkage assembly 36 in the direction indicated by the arrow 110 so that the rectangular-shaped member 96 of the combination pivot-locking assembly 40 is positioned within the square-shaped portion 102 of the key-shaped opening 94. Thus, the application of a pressure on the first linkage assembly in the direction indicated by the arrow 110 locks the folding linkage assembly 32 in the first, retracted position.

The folding outrigger 32 of the present invention provide a self-locking feature when the first linkage assembly 36 and the second folding linkage assembly 38 are in the second, extended position by placing a downward load on the first linkage assembly 36. Alternatively, when the folding outrigger 32 is in the first, retracted position the folding outrigger 32 can be locked in the first, retracted position via the combination pivot-locking assembly 40 by applying a downward force on the tab 64 of the first linkage assembly 36 as hereinbefore set forth. Thus, the outrigger assembly 32 of the present invention is provided with a self-storing, self-locking feature.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. A folding outrigger for use on a load transporting vehicle having a first side, a second side and a load supporting structure therebetween, the folding outrigger in combination with adjacent folding outriggers adapted to receive and support an extension member thereon such that the load supporting structure of the vehicle can be increased in size, the folding outrigger comprising:

a first linkage assembly having a first end portion and an opposed second end portion, the first end portion of the first linkage assembly pivotally connected to one side of the load transporting vehicle such that the first linkage assembly is movable from a first position substantially adjacent the side of the load transporting vehicle to a second position wherein the longitudinal axis of the first linkage assembly is substantially parallel to a lateral axis of the load supporting structure;

a second foldable linkage assembly having a first end portion and an opposed second end portion, the first end portion of the second foldable linkage assembly pivotally connected to the opposed second end portion of the first linkage assembly, the opposed second end portion of the second foldable linkage assembly pivotally connected to the one side of the transporting vehicle such that the opposed second end portion of the second foldable linkage assembly is disposed a distance from the first end portion of the first linkage assembly and substantially vertically aligned therewith, the second foldable linkage assembly being movable between a folded first position wherein the second foldable linkage assembly is in a folded position substantially adjacent the side of the load transporting vehicle when the first linkage assembly is in the first position and an extended second position wherein the second foldable linkage assembly positions the first linkage assembly in its second position; and combination pivot-locking means operably disposed on the second foldable linkage assembly for enabling pivotal movement of the second foldable linkage assembly between the folded first position and the extended second position, the combination pivot-locking means being adapted to lock the second foldable linkage assembly in its extended second position, the combination pivot-locking means further being adapted to lock the first linkage assembly and the second foldable linkage assembly in their respective first positions substantially adjacent the one side of the load transporting vehicle.

2. The folding outrigger of claim 1 wherein the first end portion of the first linkage assembly is pivotally connected to the side of the load transporting vehicle via a pivot means for providing pivotal movement of the first linkage assembly between the first position and the second position, the pivot means further providing vertical movement of the first linkage assembly in one of the first and second positions such that the vertical movement of the first linkage assembly via the pivot means enables the combination pivot-locking means to selectively lock and unlock the first linkage assembly and the second foldable linkage assembly of the folding outrigger in one of the first and second positions.

3. The folding outrigger of claim 2 wherein the pivot means comprises:

a pair of spatially disposed lug members, each of the lug members having a vertically disposed, axially aligned, elongated aperture therein; and a pivot assembly positionable through the aligned elongated apertures of the lug members, the pivot assembly pivotally connecting the first end portion of the first linkage assembly to the lug members such that the first linkage assembly is pivotally and vertically movable via the pivot assembly and the elongated apertures of the lug members.

4. The folding outrigger of claims 1 or 3 wherein the second foldable linkage assembly comprises:

a lower linkage member having a first end portion and an opposed second end portion; and at least one upper linkage member having a first end portion and an opposed second end portion, the first end portion of the lower linkage member being pivotally connected to the opposed second end portion of the upper linkage member via the combination pivot-locking means, the opposed second end portion of the lower linkage member pivotally connected to the one side of the load transporting vehicle, and the first end portion of the upper linkage member pivotally connected to the opposed second end of the first linkage assembly.

5. The folding outrigger of claim 4 wherein the first end portion of the lower linkage member is provided with a key-shaped opening therein, the key-shaped opening characterized as having an enlarged, substantially circular portion and a substantially square-shaped portion, and wherein the pivot-locking means comprises, in combination with the key-shaped opening, a substantially rectangular-shaped member disposed on the opposed second end portion of the upper linkage member and extending a distance therefrom such that the longitudinal axis of the rectangular-shaped member is substantially normal to the longitudinal axis of the upper linkage member, the substantially rectangular-shaped member being disposed in the enlarged, substantially circular portion of the key-shaped opening for pivotal movement of the upper and lower linkage members of the second foldable linkage assembly when the first linkage assembly and the second foldable linkage assembly of the folding outrigger are moved between one of the first position and the second position, the substantially rectangular-shaped member being disposed in the substantially square-shaped portion of the key-shaped opening when the first linkage assembly and the second foldable linkage assembly of the folding outrigger are locked in one of the first and second positions.

6. The folding outrigger of claim 4 wherein the second foldable linkage assembly comprises a pair of the upper linkage members, the upper linkage members being disposed in a parallel, spatial relationship such that at least a portion of the lower linkage member is positionable therebetween when the second foldable linkage member is moved between one of the first and second position, the lower linkage assembly being positioned between the pair of upper linkage members when the second foldable linkage assembly and the first linkage assembly of the folding outrigger are in the first position.

7. The folding outrigger of claim 6 wherein the first end portion of the lower linkage is provided with a key-shaped opening therein, the key-shaped opening being characterized as having an enlarged, substantially circular portion and a substantially square-shaped portion, and wherein the pivot-locking means comprises, in combination with the key-shaped opening, a substantially rectangular-shaped member disposed on the opposed second end portions of the upper linkage members so as to extend therebetween, the opposed second end portion of the upper linkage member operably connected to the first end portions of the lower linkage members via the key-shaped opening and the substantially rectangular-shaped member such that when the first linkage assembly and the second foldable linkage assembly of the folding outrigger are in the first position the lower linkage member is disposed between the upper linkage member, the substantially rectangular-shaped member and the key-shaped opening of the pivot-locking means cooperating such that when the rectangular-shaped member is positioned within the enlarged substantially circular portion of the key-shaped opening the lower linkage member and the upper linkage members of the second foldable linkage assembly are pivotally movable with the first linkage assembly of the folding outrigger between one of the first and second position, when the rectangular-shaped member is positioned within the substantially square-shaped portion of the key-shaped opening the lower linkage member and the upper linkage member of the second foldable linkage cooperate with the first linkage assembly to lock the first linkage assembly and the second foldable linkage assembly of the folding outrigger in one of the first and second positions.

8. The folding outrigger of claim 7 wherein the first linkage assembly comprises a first side, a second side, and an upper side, the first and second sides being disposed in a substantially parallel, spatial relationship and interconnected via the upper side such that a recessed portion is formed thereby, the recessed portion extending the length of the first linkage assembly, and wherein the first end portions of the upper linkage members are pivotally connected to the opposed second end portions of the first linkage assembly via the first and second sides thereof such that when the first linkage assembly and the second foldable linkage assembly of the folding outrigger are in the first position the upper linkage members and the lower linkage member of the second foldable linkage assembly are disposed within the recessed portion of the first linkage assembly such that the substantially rectangular-shaped member of the combination pivot-locking means can be positioned within the square shaped portion of the key-shaped opening of the combination pivot-locking means to lock the first linkage assembly and the second foldable linkage assembly of the folding outrigger in the first position.

9. The folding outrigger of claim 7 wherein the first linkage assembly further commprises a tab disposed on the opposed end portion thereof, the tab extending from the upper side of the first linkage assembly, the tab and the upper side of the first linkage assembly cooperating to support and maintain the extension member on the first linkage assembly of the folding outrigger.

10. An improved outrigger pivotally connected to a side portion of a load supporting structure such that the outrigger is vertically movable between a retracted position substantially adjacent the side portion of the load supporting structure and an extended position, the outrigger comprising:
   a first linkage assembly having a first end portion and an opposed second end portion, the first end portion of the first linkage assembly pivotally connected to the side portion of the load supporting structure such that the first linkage assembly is vertically pivotable from a first position substantially adjacent the side portion of the load supporting structure to a second position wherein the longitudinal axis of the first linkage assembly is substantially parallel to a lateral axis of the load supporting structure;
   a second foldable linkage assembly having a first end portion and an opposed second end portion, the first end portion of the second foldable linkage assembly pivotally connected to the opposed second end portion of the first linkage assembly, the opposed second end portion of the second foldable linkage assembly pivotally connected to the side portion of the load supporting structure such that the opposed second end portion of the second foldable linkage assembly is disposed a distance from the first end portion of the first linkage assembly and substantially vertically aligned therewith, the second foldable linkage assembly being movable between a folded first position wherein the second foldable linkage assembly is in a folded position substantially adjacent the side portion of the load supporting structure when the first linkage assembly is in the first position and an extended second position wherein the second foldable linkage assembly positions the first linkage assembly in its second position; and
   combination pivot-locking means operably disposed on the second foldable linkage assembly for enabling pivotal movement of the second foldable linkage assembly between the folded first position and the extended second position, the combination pivot-locking means being adapted to lock the second foldable linkage assembly in its extended second position, the combination pivot-locking means further being adapted to lock the first linkage assembly and the second foldable linkage assembly in their respective first positions substantially adjacent the side portion of the load supporting structure.

11. The improved outrigger of claim 10 wherein the first end portion of the first linkage assembly is pivotally connected to the side portion of the load supporting structure via a pivot means, the pivot means providing pivotal movement of the first linkage assembly between the first position and the second position and vertical movement of the first linkage assembly in one of the first and second positions, the vertical movement of the first linkage assembly via the pivot means enabling the combination pivot-locking means to selectively lock and unlock the folding outrigger in one of the retracted position and the extended position.

12. The improved outrigger of claim 11 wherein the pivot means comprises:
   a pair of spatially disposed lug members, each of the lug members having a vertically disposed, axially aligned, elongated aperture therein; and
   a pivot assembly positionable through the aligned elongated apertures of the lug members, the pivot assembly pivotally connecting the first end portion of the first linkage assembly to the lug members such that the first linkage assembly is pivotally and vertically movable via the pivot assembly and the elongated apertures of the lug members.

13. The improved outrigger of claims 10 or 12 wherein the second foldable linkage assembly comprises:
   a lower linkage member having a first end portion and an opposed second end portion;
   at least one upper linkage member having a first end portion and an opposed second end portion; and
   the first end portion of the lower linkage member being pivotally connected to the opposed second end portion of the upper linkage member via the combination pivot-locking means, the opposed second end portion of the lower linkage members pivotally connected to the side of the load supporting structure, and the first end portion of the upper linkage member pivotally connected to the opposed second end of the first linkage assembly.

14. The improved outrigger of claim 13 wherein the first end portion of the lower linkage member is provided with a key-shaped opening therein, the key-shaped opening characterized as having an enlarged, substantially circular portion and a substantially square-shaped portion, and wherein the pivot-locking means comprises, in combination with the key-shaped opening, a substantially rectangular-shaped member disposed on the opposed second end portion of the upper linkage member and extending a distance therefrom such that the longitudinal axis of the rectangular-shaped member is substantially normal to the longitudinal axis of the upper linkage member, the substantially rectangular-shaped member being disposed in the enlarged, substantially circular portion of the key-shaped opening for pivotal movement of the upper and lower linkage members when the outrigger is moved between one of the retracted position and the extended position, the substantially rectangular-shaped member being disposed in the substantially square-shaped portion of the key-shaped opening when the outrigger is locked in one of the retracted position and the extended position.

15. The improved outrigger of claim 13 wherein the second foldable linkage assembly comprises a pair of the upper linkage members, the upper linkage members being disposed in a parallel, spatial relationship such that at least a portion of the lower linkage member is positionable therebetween when the outrigger is moved between one of the retracted and the extended position, the lower linkage member being positioned between the pair of upper linkage members when the outrigger is in the retracted position.

16. The outrigger of claim 15 wherein the first end portion of the lower linkage member is provided with a key-shaped opening therein, the key-shaped opening having characterized as having an enlarged, substantially circular portion and a substantially square-shaped portion, and wherein the pivot-locking means comprises, in combination with the key-shaped opening, a substantially rectangular-shaped member disposed on the opposed second end portions of the upper linkage members so as to extend therebetween, the opposed second end portion of the upper linkage member operably connected to the first end portions of the lower linkage members via the key-shaped opening and the substantially rectangular-shaped member such that when the outrigger is in the retracted position the lower linkage member is disposed between the upper linkage member, the substantially rectangular-shaped member and the key-shaped opening of the pivot-locking means cooperating such that when the rectangular-shaped member is positioned within the enlarged substantially circular portion of the key-shaped opening the lower linkage member and the upper linkage members of the second foldable linkage assembly are pivotally movable with the first linkage assembly such that the outrigger is movable between one of the retracted position and the extended position, when the rectangular-shaped member is positioned within the substantially square-shaped portion of the key-shaped opening the lower linkage member and the upper linkage members of the second foldable linkage assembly cooperate with the first linkage assembly to lock the outrigger in one of the retracted position and the extended position.

17. The outrigger of claim 16 wherein the first linkage assembly comprises a first side, a second side and an upper side, the first and second sides being disposed in a substantially parallel, spatial relationship an interconnected via the upper side such that a recessed portion is formed thereby, the recessed portion extending the length of the first linkage assembly, and wherein the first end portions of the upper linkage members of the second foldable linkage assembly are pivotally connected to the opposed second end portions of the first linkage assembly via the first and second sides thereof such that when the outrigger is in the retracted position the upper linkage members and the lower linkage member of the second foldable linkage assembly are disposed within the recessed portion of the first linkage assembly such that the substantially rectangular-shaped member of the combination pivot-locking means can be positioned within the square shaped portion of the key-shaped opening of the combination pivot-locking means to lock the outrigger in the retracted position.

18. The improved outrigger of claim 17 wherein the first linkage assembly further comprises a tab disposed on the opposed end portion thereof, the tab extending from the upper side of the first linkage assembly.

* * * * *

UNITED STATES PATENT AND TRADEMARK OFFICE
CERTIFICATE OF CORRECTION

PATENT NO. : 4,311,322
DATED : January 19, 1982
INVENTOR(S) : James M. Verros

It is certified that error appears in the above-identified patent and that said Letters Patent are hereby corrected as shown below:

In column 11, line 18, the word "member" should be --assembly--.

In column 11, line 19, the word "assembly" should be --member--.

In column 12, line 13, the word "commprises" should be --comprises--.

Signed and Sealed this

Eighth Day of June 1982

[SEAL]

Attest:

Attesting Officer

GERALD J. MOSSINGHOFF

Commissioner of Patents and Trademarks